United States Patent [19]

Yoshida et al.

[11] Patent Number: 5,431,554
[45] Date of Patent: Jul. 11, 1995

[54] VERTICAL INJECTION MOLDING MACHINE

[75] Inventors: Hiroshi Yoshida; Kazuki Kuse, both of Toyama, Japan

[73] Assignee: Yoshida Kogyo K.K., Tokyo, Japan

[21] Appl. No.: 138,437

[22] Filed: Oct. 20, 1993

[30] Foreign Application Priority Data

| Oct. 22, 1992 [JP] | Japan | 4-284529 |
| Oct. 22, 1992 [JP] | Japan | 4-284530 |
| Oct. 22, 1992 [JP] | Japan | 4-284531 |

[51] Int. Cl.⁶ ............................. B29C 45/10
[52] U.S. Cl. ........................ 425/183; 425/190; 425/545; 425/574; 425/185
[58] Field of Search ......... 425/183, 185, 186, 190, 425/545, 574, 814

[56] References Cited

U.S. PATENT DOCUMENTS

| 4,165,959 | 8/1979 | Dechavanne | 425/574 |
| 4,421,469 | 12/1983 | Egger et al. | 425/183 |
| 4,588,365 | 5/1986 | Holzschuh | 425/183 |

FOREIGN PATENT DOCUMENTS 57-031547 2/1982 Japan.
58-208027 12/1983 Japan.

*Primary Examiner*—James P. Mackey
*Attorney, Agent, or Firm*—Hill, Steadman & Simpson

[57] ABSTRACT

A lower mold attachment plate, on the upper surface of which the fixed mold half is attached, is fixed to a machine base. An upper mold attachment plate, to which the movable mold half is attached in opposite to the fixed mold half, is movable upwardly and downwardly by mold moving cylinders. A rotary disc, which has plural injection cylinder insertion holes in the same circle in vertical alignment with plural injection cylinder insertion holes of the upper mold attachment plate, is rotatably pivoted on the upper surface of the upper mold attachment plate. Plural injection units arranged over the rotary disc in predetermined distances along the circle are joined with the rotary disc as a unit. As the rotary disc is rotated to a divided angular position, a slide fastener chain is conveyed along the extension of the chain travelling path, by a predetermined length at every injection molding by means of chain conveyer.

8 Claims, 4 Drawing Sheets

VERTICAL INJECTION MOLDING MACHINE

BACKGROUND OF THE INVENTION

1. Field of the Invention

This invention relates to a vertical injection molding machine for continuously manufacturing a slide fastener chain by molding a pair of coupling element rows on and along confronting edges of a pair of parallel fastener tapes being conveyed horizontally and also molding top and bottom stops, if necessary. More particularly the invention relates to a vertical injection molding machine, for manufacturing a slide fastener chain, which machine is equipped with a plurality of injection units on a rotary disc situated above upper and lower mold halves so that change of color of molding material and change of molding material can be performed in a short time by rotating the rotary disc, always securing high dimensional precision. In addition the invention relates to a support structure for the rotary disc of the vertical injection molding machine.

2. Description of the Related Art

Generally in the conventional vertical injection molding machines, for example, automatic color change is performed by discharging residual chips off the screw, putting cleaning chips into the screw, cleaning inside the screw, supplying new molding chips to be used for the next molding, and making several empty shots, whereupon normal operation starts. Therefore color changing takes a considerable time (about two minutes) which would influence greatly on the productivity of recent years' flexible manufacturing.

In order to reduce the time for color change, etc., a solution has been proposed by, for example, Japanese Patent Publication No. SHO 63-23892 disclosing a vertical injection molding machine in which a plurality of injection heads are supported on a fixed table so as to be rotatable about a vertical axis and in which a plurality of sets of fixed and movable mold halves are arranged concentrically over upper and lower rotary discs via upper and lower attachment plates, respectively, the upper and lower rotary discs being situated under the fixed table and rotatable about the same vertical axis with respect to the rotational axis of the injection heads.

In this known vertical injection molding machine, the upper mold half near the injection nozzle is the fixed mold half, while the lower mold half remote from the injection nozzle is the movable mold half. At the time of color change, the used injection head is moved to the color changing position, and the other injection head for which arrangements have previously been made for the next injection is moved to the injection position, in an effort to perform the switching of the injection heads within a short time. In this case, since simultaneously with the switching, the sets of movable and fixed mold halves also can be changed, it is possible to form different molded products by replacing the mold sets with desired mold sets one after another.

However, the above-mentioned publication merely discloses a vertical injection molding machine in which the rotary disc rotatable on the fixed table supports the plural heavy-weight injection units and is totally silent about any countermeasure, setting aside a rotating means for the rotary disc, against the excessive load while the rotary disc is rotating. Thus when the excessive load is exerted on the rotary disc, a considerably large drive motor is necessary in smoothly rotating the rotary disc sliding on the fixed table in face-to-face contact.

Using rollers or balls on one of the confronting surfaces of the rotary disc and the fixed table could be considered in an attempt to smoothly rotate the rotary disc on the fixed table while the excessive load is exerted on the rotary disc. But the relationship between the rotary disc and the fixed table is satisfied not only by realizing merely smooth rotation of the rotary disc but also by surely fixing the rotary disc at a predetermined position on the fixed table during the injection molding. Therefore, existence of rollers and balls would make it difficult to position and secure the rotary disc on the fixed table.

Further, in the prior art vertical injection molding machine equipped with plural injection units, the injection cylinder and a number of members to be actuated by liquid pressure, e.g. a lock mechanism to be actuated hydraulically, rotate about the same axis. The number of liquid-pressure pipes to be connected to these many members for actuation is necessarily large; some pipes tend to cross one another or tend to be twisted or bent so that they can easily damaged, thus requiring laborious maintenance.

Furthermore, partly since the injection heads are situated above the fixed table and partly since the plural sets of upper and lower mold halves are situated under the fixed table, the fixed mold half and the movable mold half must be upper and lower ones, respectively, in order to reduce the vertical stroke of the injection nozzle to a minimum.

A slide fastener chain is a continuous length of opposed tapes having opposed coupling element rows on and along confronting edges of the respective tapes; if such slide fastener chain is to be processed (to a correct size) with high precision, it is necessary to control the tension of the slide fastener chain with very high precision while it is being continuously conveyed. But assuming that this prior art vertical injection molding machine is used in molding coupling element rows on a slide fastener chain, it is necessary to convey the slide fastener chain hanging in midair and contacting the cavity surface of the fixed upper mold half. If the chain were guided on the movable lower mold half, it would have been necessary to move a slide fastener chain conveyor upwardly and downwardly in synchronism with the moving of the lower mold half toward and away from the upper mold half, thus making the mechanism complex and larger in size and hence impractical.

SUMMARY OF THE INVENTION

It is therefore a first object of this invention to provide a vertical injection molding machine which can secure high dimensional precision and can make arrangements for color change, material change, etc.

A second object of the invention is to provide a channel distributor which prevents pipes from crossing one another, being twisted or bent or otherwise and thus damaged, even though the frequency of switching-by-rotation of hydraulically actuated parts increases.

A third object of the invention is to provide a support structure, for a material changing rotary disc of a vertical injection molding machine, which structure is able to smoothly rotate the rotary disc on a support plate at the time of, for example, color change and to position and secure the rotary disc surely in a predetermined position on the support plate at the time of, for example, injection molding.

In order to accomplish the first object, according to this invention, there is provided a vertical injection molding machine, comprising: a lower mold attachment plate fixedly secured to a machine base; a fixed mold half attached to an upper surface of said lower mold attachment plate; an upper mold attachment plate movable upwardly and downwardly by mold moving cylinders and having a plurality of peripheral injection cylinder insertion holes; a movable mold half attached to the uper mold attachment plate in confronting relation with the fixed mold half; a rotary disc pivotally mounted on an upper surface of the upper mold attachment plate and having a plurality of peripheral injection cylinder insertion holes in alignment with the first-named peripheral injection cylinder insertion holes of the upper mold attachment plate; a plurality of injection units situated above and connected integrally with the rotary disc, the injection units being arranged peripherally in predetermined distances; and means for dividing the rotation of the rotary disc.

In order to accomplish the second object, according to the invention, there is provided a channel distributor adapted to be connected to at least rotary members of a vertical injection molding machine which is equipped with a plurality of injection units arranged peripherally above upper and lower mold halves for corotation with the rotary disc about the vertical axis of the rotary disc and in which as the rotary disc is rotated, the individual injection units are positioned alternately in an injecting position and a waiting position in such a manner that while one of the injection units is in the injection position and operative for injection, the other at least an injection unit is in the waiting position where change of molding material can be performed, wherein said channel distributor has a double-tube structure composed of outer and inner cylindrical tubes rotatable relative to each other about their common axis, said outer cylindrical tube having on its outer peripheral surface a plurality of liquid pressure port vertically spaced at predetermined distances, said inner cylindrical tube having, in its outer peripheral surface at a position confronting the respective liquid pressure ports, a plurality of annular grooves each of which is provided with a channel extending radially with a predetermined phase difference from the adjacent annular grooves, ends of each of the channels communicating with a plurality of ends of channels which are formed at distances on the same peripheral surface in a hollow portion of the inner cylindrical tube in parallel relationship to the axis of the inner cylindrical tube and which open to end surfaces of the inner cylindrical tube.

In order to accomplish the third object, according to the invention, there is provided a support structure for a rotary disc of vertical injection molding machine which is equipped with a plurality of injection units arranged peripherally above upper and lower mold halves for corotation with the rotary disc about the vertical axis of the rotary disc and in which as the rotary disc is rotated, the individual injection units are positioned alternately in an injecting position and a waiting position in such a manner that while one of the injection units is in the injection position and operative for injection, the other at least an injection unit is in the waiting position where change of molding material can be performed, wherein the rotary disc is pivotally mounted on the movable mold attachment plate having on its upper surface a vertical shaft and internally defining a high-pressure air supply channel which has a high-pressure air ejection port opening to one or more recesses distributed over the upper surface of the movable mold attachment plate.

The operation of this vertical injection molding machine as applied in molding a slide fastener chain will now be described.

When one of the plural injection units is located above the orifice of the movable mold half, the lock mechanism is actuated to lock the rotary disc on the movable mold attachment plate, whereupon the mold moving cylinder is actuated to lower the injection unit and the movable mold attachment plate, thereby closing and clamping the mold.

Then, the injection unit located above and in alignment with the injection cylinder insertion holes respectively formed in the movable mold attachment plate and the rotary disc starts to operate: lowering the injection cylinder to bring the nozzle tip into contact with the orifice of the movable mold half and then injecting the molding material in molten state to mold coupling element rows, etc. on and along confronting edges of the two fastener tapes T via the sprue, runner and gates. This injection molding is repeated a predetermined number of times until a required length of slide fastener chain is molded. During the molding, in the remaining injection units, arrangements for material change such as color change or quality change to be made for subsequent molding has been finished and these injection units are in the waiting position.

Upon termination of the previous molding of slide fastener chain, the movable mold half starts to move upwardly and, at the same time, the lock mechanism releases the locking of the rotary disc by a signal from the control unit so that the rotary disc is movable on the movable mold attachment plate. At that time, in the illustrated preferred embodiment, high-pressure air is supplied to a compressed air passageway formed in the movable mold attachment plate so that the high pressure air will be ejected from the ejection port into a chamber defined by the recesses, which are formed in the surface of the movable mold attachment plate, and the rear surface of the rotary disc to keep the chamber under high pressure in such a manner that the rotary disc floats slightly to the surface of the movable-mold attachment plate. While the rotary disc is floating, the drive motor is energized to rotate the rotary disc smoothly through a predetermined angle and is then deenergized to stop rotation of the rotary disc when the remaining injection units, which are in the waiting position after the arrangements for subsequent injection have been finished, reach the position in alignment with the orifice of the movable mold half. Simultaneously with the stopping of rotation of the rotary disc, the supply of high-pressure air is stopped so that the rotary disc is immovably secured on the upper surface of the support plate due to its very heavy weight. At that time, the lock mechanism also is actuated to complete the holding of the rotary disc in a predetermined position on the movable mold attachment plate.

Since the pipes connected with the individual hydraulically actuated rotary members above the rotary disc as of the injection molding machine are connected to the individual channels of the inner cylindrical tube rotatable in response to rotation of the individual rotary members inside the fixed outer cylindrical tube of the channel distributor, the pipes are rotated about the axis of rotation of the rotary disc in synchronism therewith so that the pipes can be prevented from being twisted by themselves and crossing one another or from any other damage. Since the plural compressed-liquid supply pipes also are connected convergently to the outer cylindrical tube, it is possible to facilitate the designing and installing of the pipes.

Generally, because the total weight of the injection molding machine and the support members is very large and is exerted on the rotary disc, a high-power motor has to be used as the drive motor for the rotary disc, which would occupy a much larger space and would be not economical. Whereas according to this invention, the rotary disc is rotated using compressed air and hence can be rotated by a very small force; it is therefore possible to use a small-size, low-output motor, which would occupy only a small space and would be economical.

DETAILED DESCRIPTION

Figure 1:
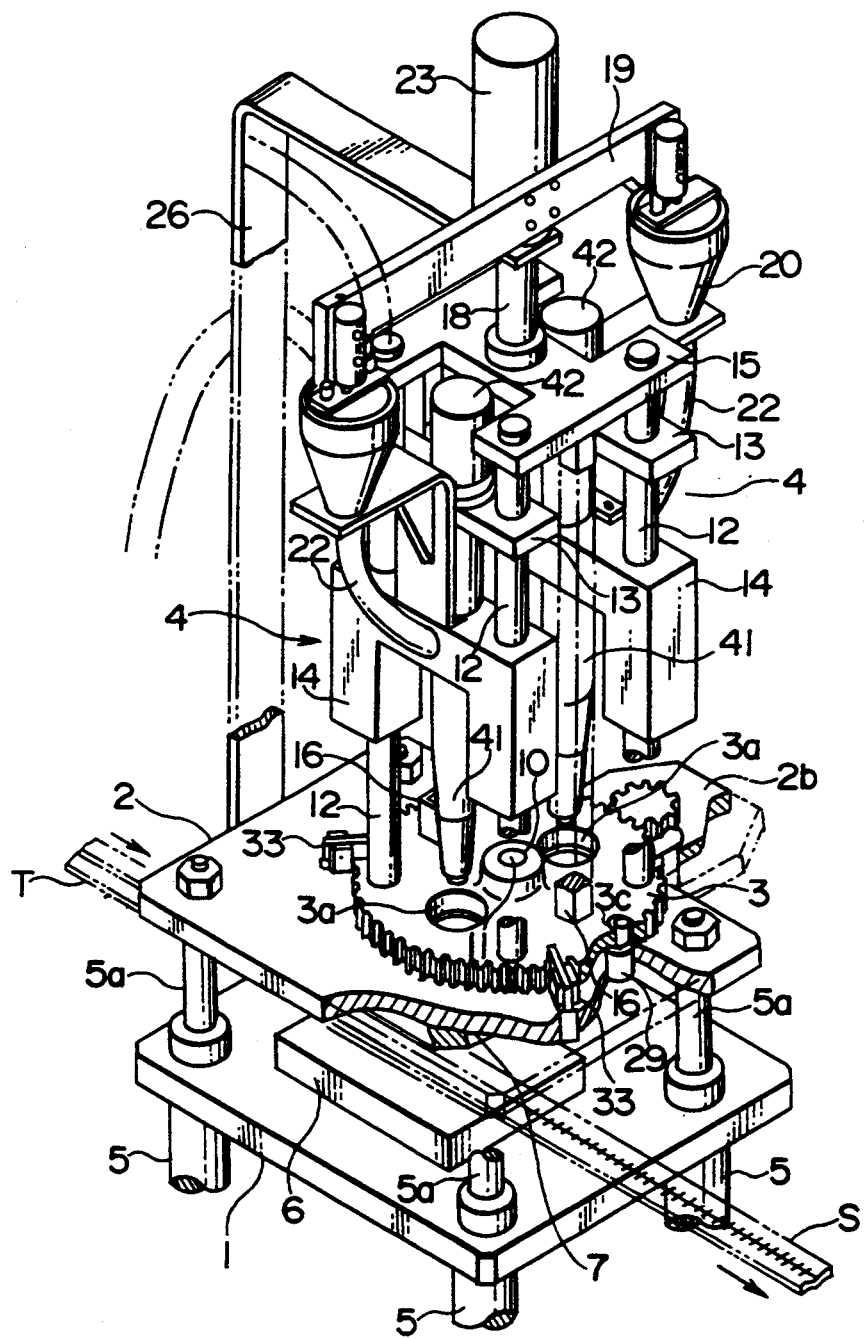
FIG. 1 is a perspective view, with parts broken away, of an injection molding machine, for molding a slide fastener chain, of a typical embodiment of this invention.
Figure 2:
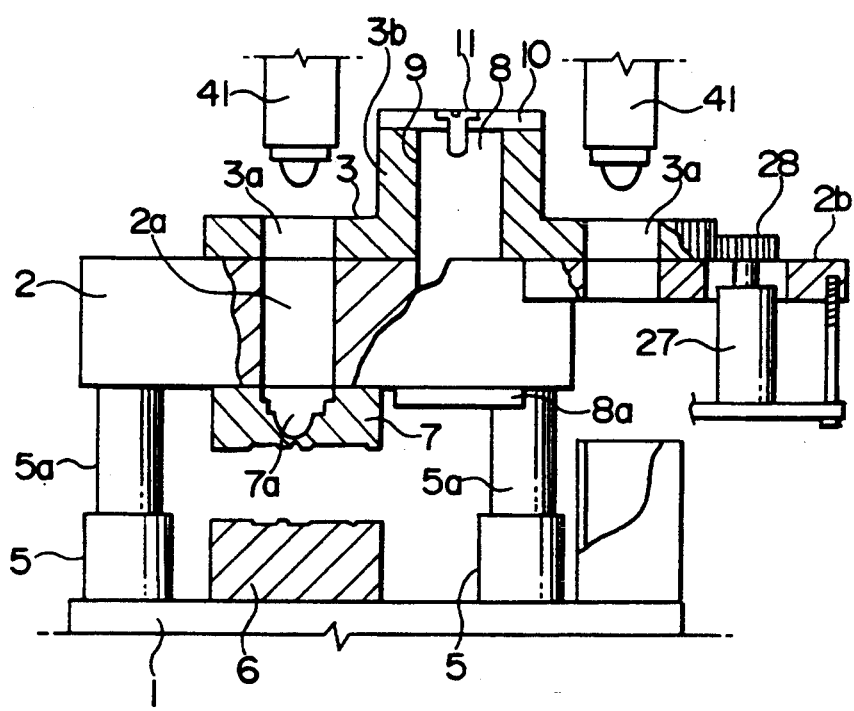
FIG. 2 is an enlarged front view, with parts broken away, of the main part of the machine.

This invention will now be described in detail in connection with an illustrated embodiment. FIG. 1 is a perspective view showing the main part of a vertical injection molding machine, for molding a slide fastener chain, according to a typical embodiment of the invention. FIG. 2 is a front view, with parts broken away, of upper and lower mold halves and injection cylinders. In FIGS. 1 and 2, a fastener tape feed mechanism, a take-up mechanism for a slide fastener chain, on which coupling elements have been molded, and other essential mechanisms or parts, which are similar to those of an ordinary injection molding machine, are omitted here for clarity. The vertical injection molding machine of this invention should by no means be limited to the illustrated type, which is for molding a slide fastener chain. This invention may be also applied to a vertical injection molding machine of the type in which as disclosed in, for example, Japanese Patent Publication No. SHO 63-23892, molded products are to be produced as molding materials are changed by rotating plural injection units over the upper and lower mold halves.

The vertical injection molding machine for molding a slide fastener chain comprises a fixed mold attachment plate 1 immovably situated in at least a lower portion of the machine, a movable mold attachment plate 2 situated in an intermediate portion of the machine, a rotary disc 3 supported on the upper surface of the movable mold attachment plate 2 and rotatable about the vertical axis, a plurality of injection units 4 connected to the upper surface of the rotary disc 3, and a non-illustrated slide-fastener-chain conveyer situated on the extension of a tape travelling path formed on the face of a fixed mold half.

In FIG. 1, the fixed mold attachment plate 1 situated at the lower portion of the machine is supported at four corners by four cylinders 5 fixedly secured to a non-illustrated machine base, while the movable mold attachment plate 2 is fixedly secured at four corners on to the upper end of a piston rod 5a of each cylinder 5. These four cylinders serve to close and clamp the mold. To the upper surface of the fixed mold attachment plate 1, a fixed mold half 6 is attached. To the movable mold attachment plate 2, a movable mold half 7 is attached in opposite to the fixed mold half 6. On the faces of the fixed and movable mold halves 6, 7, at least two parallel travelling paths (not shown) for fastener tapes T are defined, between which cavities, for coupling element rows, etc., communicating with runner and gates are defined.

The upper end of a vertical shaft 8 is projecting from the upper surface of the movable mold attachment plate 2 at a position spaced by a predetermined distance from an injection cylinder insertion hole 2a of the movable mold attachment plate 2. The rotary disc 3 is rotatably mounted on the projected portion of the vertical shaft 8 via a bearing 9. The radius of the rotary disc 3 is set to be larger than the distance between the axis of the vertical shaft 8 and the center of the individual injection cylinder insertion hole 2a, and the rotary disc 3 has injection cylinder insertion holes 3a, the number (two in the illustrated example) of which corresponds to that of the injection units 4, being located peripherally on a circle with a radius which is the same as the distance described above. A plain gear is formed on and around the outer peripheral surface of the rotary disc 3. The vertical shaft 8 has at one end a flange 8a and centrally at the other end a threaded hole; as is apparent from FIG. 2, the vertical shaft 8 is inserted through the shaft hole of the rotary disc 3 from the lower side, and a closure member 10 is brought into contact with the end surface of a boss 3b of the rotary disc 3, whereupon the closure member 10 is fastened to the end of the vertical shaft 8 by a screw 11.

In the illustrated embodiment, four guide posts 12 are mounted on the marginal portion of the rotary disc 3, and a screw drive anchoring plate 13 and an injection cylinder support member 14 in the form of a downwardly opening generally C-shape block are supported, with a predetermined distance, on an adjacent pair of the guide posts 12 and are movable upwardly and downwardly by a non-illustrated drive unit for the injection cylinders 41. The drive unit for the injection cylinders 41 may be realized by constituting the guide post 12 in a cylinder structure or by installing a drive cylinder independently of the guide support post 12. The upper ends of the four guide posts 12 are fixed to an H-shape support plate 15, and the support plate 15 and the rotary disc 3 are fixedly connected to each other by two square pillars 16, thus supporting the injection cylinders 41 with improved firmness.

A screw drive 42 is fixedly secured to each of the two screw drive anchoring plate 13, and each of the two injection cylinders 41 is fixedly secured to the respective injection cylinder support member 14 and has a downwardly directed vertical nozzle. The nozzle tip of each injection cylinder 41 is opposed to the respective injection cylinder insertion hole 3a of the rotary disc 3.

Figure 3:
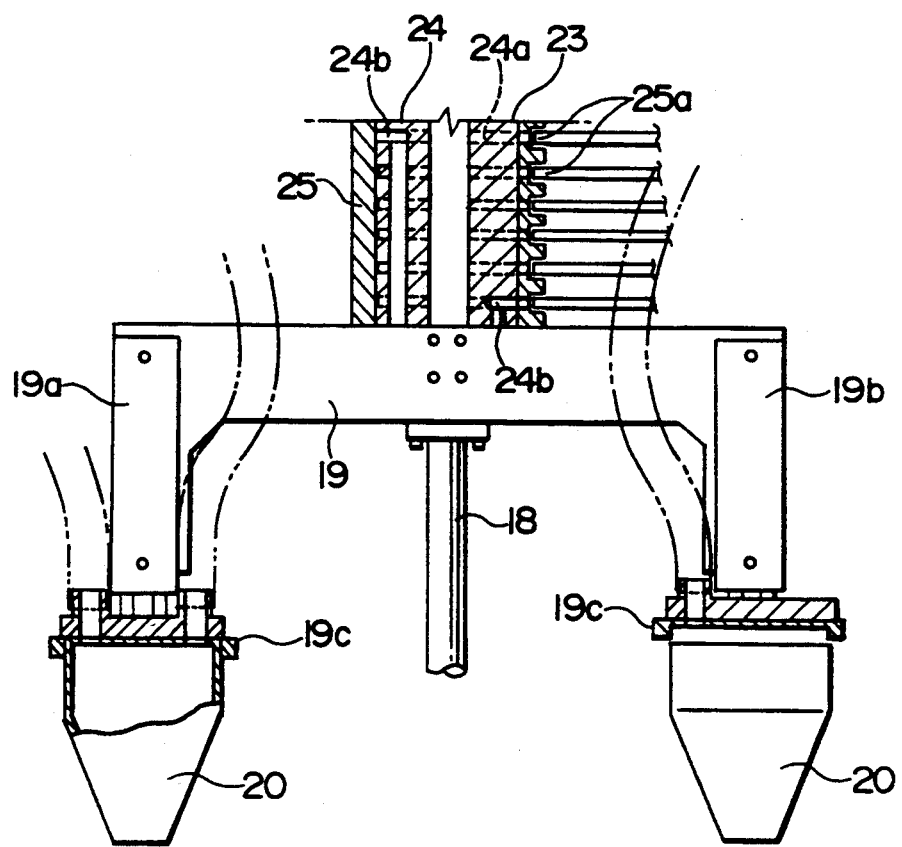
FIG. 3 is a front view, with parts broken away, of a channel distributor and a molding material supply hopper of the machine.

A shaft member 18 is mounted centrally on the H-shape support plate 15 in alignment with the axis of rotation of the rotary disc 3, and a hopper support bracket 19 is fixedly secured to the upper portion of the shaft member 18 and extends in the same direction as that of arrangement of the injection cylinders 41 of each pair. Vertical cylinders 19a, 19b are fixedly secured to the respective ends of the hopper support bracket 19, and a pair of closure members 19c are fixedly secured to the respective outer rod ends of the cylinders 19a, 19b. To the closure member 19c, a non-illustrated material supply pipe is attached. When the positions of the injection units 4 are switched as the rotary disc 3 is rotated, the cylinders 19a, 19b are actuated to shrink the respective rod ends, as shown in FIG. 3 right side, so that the closure members 19c are moved away from respective material supply hoppers 20. At the time of injection molding and of making arrangements for the next injection molding, the rod ends extend to close the inlet of the material supply hopper 20 with the closure member 19c so that material can be supplied into the hopper surely. The outlet of the supply hopper 20 is connected to a non-illustrated material intake port of the injection cylinder 41 via a material supply pipe 22.

FIG. 3 shows a channel distributor 23 having a double-tube structure and attached to the upper end of an L shape support frame 26. As is apparent from FIG. 3, the channel distributor 23 is composed of inner and outer cylindrical tubes 24, 25. The inner cylindrical tube 24 has on its outer peripheral surface a plurality of annular grooves 24a in steps, each annular groove 24a having a radially extending channel 24b. The channels 24b are displaced in phase step by step, each channel 24b extending directly downwardly and terminating in an open lower end. On the outer peripheral surface of the outer cylindrical tube 25, a plurality of liquid pressure ports 25a are formed in a straight line parallel to the axis in opposite to the multi-step annular groove 24a. The inner and outer cylindrical tubes 24, 25 are joined together watertightly between the grooves via non-illustrated O rings and so as to be rotatable with respect to each other, thus constituting the channel distributor 23 of this invention. The liquid pressure ports 25a are connected to respective external liquid pressure source via non-illustrated pipes, and the open end of each channel 24b is connected to the respective hydraulically-actuated member of the injection unit 4 via non-illustrated pipe.

In the channel distributor 23, the upper end of the shaft member 18 is inserted in and fixed to the inner cylindrical tube 24, and the outer cylindrical tube 25 is supported by and fixedly secured to the L-shape support frame 26 whose lower end is fixedly mounted on the fixed mold attachment plate 1, as shown in FIG. 1. Thus the outer cylindrical tube 25 is fixed on the L-shape support frame 26, and the inner cylindrical tube 24 is rotatable, with the rotary disc 3 and the injection cylinder 41, about the vertical axis inside the outer cylindrical tube 25; at that time, the non-illustrated pipes connected with the individual hydraulically actuated members of the injection unit 4 are rotatable in synchronism therewith.

Part of the marginal portion of the movable mold attachment plate 2 extends horizontally, and an output gear 28 of a rotary-disc drive motor 27 fixedly secured to the movable mold attachment plate 2 by a suitable support means is projecting from the surface of the extended part 2b and is meshing with the rotary disc 3. The rotary-disc drive motor 27 may be a low-output stepping motor and rotates the rotary disc 3 via the gear 28 through a predetermined angle based on an instruction from a non-illustrated control means. A plurality of pin engaging holes 3c are formed in the rotary disc 3 along a common circle, and pins 29 are mounted on the movable mold attachment plate 2 along the circle so as to be received in the respective pin engaging holes 3c of the rotary disc 3. The pins 29 may be piston rods of cylinders or engaging pins normally urged upwardly by springs and disposed at positions that the plural injection cylinder insertion holes 3a of the rotary disc 3 are axially aligned with the corresponding injection cylinder insertion holes 2a of the movable mold attachment plate 2.

Figure 4:
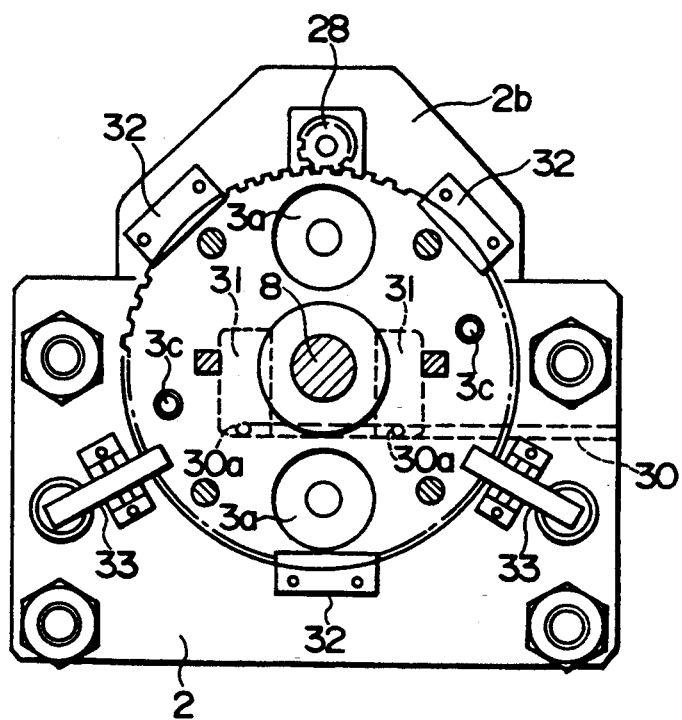
FIG. 4 is a plan view showing an attachment mechanism, for a movable-mold attachment plate and a rotary disc, according to the invention.
Figure 5:
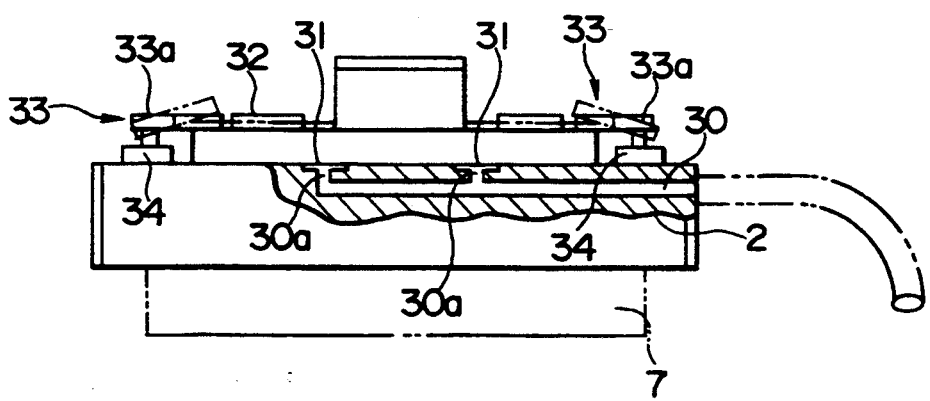
FIG. 5 is a front view, with parts broken away, of the movable-mold attachment plate and the rotary disc, showing a disc floating unit and a disc lock mechanism according to the invention.

Further, in this embodiment, the machine is equipped with a rotary disc support mechanism for supporting the rotary disc 3 so as to rotate smoothly on the upper surface of the movable mold attachment plate 2. As shown in FIGS. 4 and 5, the movable mold attachment plate 2 has internally a high-pressure air passageway 30 extending from the outer peripheral surface in the direction of chord of the rotary disc 3. The high-pressure air passageway 30 has an air pressure reservoir recesses 31 formed on the upper surface of the movable mold attachment plate 2 in symmetry with respect to the vertical shaft 8. If it is allowed designwise, the air pressure reservoir recesses 31 should be distributed over the rear surface of rotary disc 3 as uniformly and widely as possible.

On the upper surface of the movable mold attachment plate 2, a plurality of guide members 32 are mounted, along the outer peripheral edge of the rotary disc 3, for guiding the rotation of the rotary disc 3, and also clamps 33 are attached for firmly holding the rotary disc 3 to the upper surface of the movable mold attachment plate 2 during the injection molding. The guide members 32, as is apparent from FIG. 4, has an inverted L-shape cross section and an arcuate guide surface substantially complementary to the outer peripheral edge of the rotary disc 3, preventing the rotary disc 3 from floating beyond a preset dimensional allowance. On the other hand, as is apparent from FIGS. 4 and 5, each clamp 33 is composed of a lever 33a having at a free end a jaw and vertically movably pivoted at an intermediate portion and attached at a rear end to a cylinder 34. The cylinder 34 is energized according to an instruction from a non-illustrated control means to firmly force the jaw against the upper surface of the rotary disc 3 during the injection molding, thereby fixing the rotary disc 3 to the movable mold attachment plate 2. Thus the lock mechanism of the invention is constituted by the pin engaging holes 3c, the pins 29 and the clamps 33.

The operation of the vertical injection molding machine according to this invention will now be described.

Now assume that the two injection units 4, 4 are situated at the positions shown in FIGS. 1 and 2, at which time the cylinder 34 of the clamp 33 is energized to force the jaw of the lever 33a against the upper surface of the rotary disc 3 to thereby secure the rotary disc 3 to the movable mold attachment plate 2. Then as the mold moving cylinders are energized, the piston rods 5a are retracted to descend the injection units 4, 4 and the movable mold attachment plate 2, thus clamping the mold.

Then when the injection units 4 situated above the movable mold attachment plate 2 and the rotary disc 3 in alignment with the respective injection cylinder insertion holes 2a, 3a thereof start to operate, the injection cylinder 41 descends to bring the nozzle tip into contact with the ejection port 7a of the movable mold half 7 and then ejects molding material in molten state. As a result, coupling element rows, etc. are molded on confronting edges of two fastener tapes T via sprue, runner and gates. After that, the movable mold attachment plate 2 is raised by the usual method to open the mold, whereupon a molded product is separated from the fixed mold half 6. And a predetermined length of fastener tapes T are conveyed by a non-illustrated tape conveyer, and the injection units 4 are actuated again to perform the same injection molding, thereby forming coupling element rows on the fastener tapes T contiguously to the previously formed coupling element rows. At that time, since the removing of the molded product and the conveying of the fastener tapes T (or the taking up of the slide fastener chain S) take place on the surface of the fixed mold half 6, it is possible to control the tension of the chain with high precision.

The same injection molding is repeated a predetermined number of times until a required length of slide fastener chain is formed continuously. By the end of this molding with one injection unit, the arrangements for color change and/or material change of the other injection unit finishes and it assumes the waiting position.

Upon termination of previous molding of the slide fastener chain S, the upper and lower mold halves 6, 7 start to open and, at the same time, the clamps 33 release the holding of the rotary disc 3 according to the signal from a non-illustrated control means. And the pins 29 received in the pin engaging holes 3c of the rotary disc 3 are removed to make the rotary disc 3 free to rotate on the movable mold attachment plate 3. At that time, high-pressure air is supplied to the compressed air passageway 30 of the movable mold attachment plate 2 so that it is ejected from the air pressure ejection port 30a into the chamber defined by the air pressure reservoir recess 31 and the rear surface of the rotary disc 3, thus pressurizing the chamber to cause the rotary disc 3 to float slightly over the surface of the movable mold attachment plate 2. With the rotary disc 3 floating, the rotary disc drive motor 27 is energized to rotate the rotary disc 3 through a predetermined angle, and the injection unit 4 for which arrangements for the next injection molding have been completed stops at the position confronting the injection port 7a of the movable mold half 7. Upon stopping of rotation of the rotary disc 3, the supply of high-pressure air also is stopped so that the rotary disc 3 comes into contact with and is secured to the upper surface of the movable mold attachment plate 2. At that time, the pins 29 come into engagement with the corresponding pin engaging holes 3c in the marginal edge of the rotary disc 3, and the rotary disc drive motor 27 is deenergized and, at the same time, the clamps 33 are actuated, thus holding the rotary disc 3 immovable.

The total weight of the two injection units 4, 4 and the remaining support members usually runs up to 100 Kg. Since this total weight is exerted on the rotary disc 3, the rotary disc drive motor 27 must be a large-output motor in order to rotate the rotary disc 3 in surface contact with the surface of the movable mold attachment plate 2, which would occupy a much larger space and would be not economical. Whereas in the case where the rotary disc 3 is to be rotated pneumatically, it is possible to rotate the rotary disc 3 by a very small force so that a small-size motor can be used, which would be advantageous economically and space-wise.

Further in the embodiment, since the pipes which is to be connected with the hydraulic actuator of the rotary member provided in such as the injection cylinders 41 above the rotary disc 3 etc. are connected to the respective channels of the inner cylindrical tube 24 rotatable inside the fixed outer cylindrical tube 25 of the channel distributor 23 along with the rotary members, the pipes also rotate in synchronism with the rotation of the rotary disc 3 about the axis of the rotary disc 3 so that they are free from crossing one another or being twisted. Since the plural liquid pressure supply pipes also are connected concentrically to the outer cylindrical tube 25, it is possible to facilitate designing and installing the pipes.

This invention should by no means be limited to the foregoing typical embodiment and may be also applied to an ordinary type vertical injection molding machine for molding independent products, for which various modifications also may be Suggested.

With the vertical injection molding machine of this invention, molding can be performed with high dimensional precision. Since the arrangements for next different molding material can be finished on the (remaining) injection units other than the injection unit now in injection molding while the remaining injection units are rotated with the rotary disc on the movable mold attachment plate, it is possible to perform color change of molding material and material change instantly.

As is apparent from the foregoing description, according to the channel distributor of the invention for the vertical injection molding machine, partly since many pipes leading from the liquid pressure source are concentrated on the connecting support part and partly since the pipes to be connected with many members, which are to be actuated hydraulically and are rotatable about the vertical axis, are rotatable in accordance with the rotation of the members, these pipes are free from crossing one another or being twisted or bent so that meticulous designing and maintenance can be avoided and an improved durability can be secured.

With the support structure for the rotary disc of the vertical injection molding machine of the invention, partly since the rotary disc supporting the plural injection units, which are heavy in weight, to be positioned on the movable mold attachment plate can smoothly rotate slightly floating over the movable mold attachment plate by means of air pressure during rotation, and partly since the rotary disc can be surely fixed at a predetermined position on the movable mold attachment plate, it is possible to use a small-output, small-size drive motor, which is very advantageous economically and space-wise.

What is claimed is:
1. A vertical injection molding machine, comprising:
  (a) a lower mold attachment plate fixedly secured to a machine base;
  (b) a fixed mold half attached to an upper surface of said lower mold attachment plate;
  (c) an upper mold attachment plate movable upwardly and downwardly by mold moving cylinders and having at least one injection hole;
  (d) a movable mold half attached to said upper mold attachment plate in confronting relation with said fixed mold half and having an injection port open to said one injection hole;
  (e) a rotary disc rotationally mounted on an upper surface of said upper mold attachment plate and having a plurality of peripheral injection cylinder insertion holes each alignable with said at least one injection hole of said upper mold attachment plate;

(f) a plurality of injection units situated above and connected to said rotary disc, said injection units being arranged peripherally spaced apart and aligned with said peripheral injection cylinder insertion holes; and (g) means for angularly positioning said rotary disc.

2. A vertical injection molding machine according to claim 1, wherein said upper mold attachment plate has a lock mechanism for locking said rotary disc in a plurality of angular positions.

3. A vertical injection molding machine according to claim 1, further comprising a channel distributor adapted to be connected to said rotary disc, said plurality of injection units are positioned alternately in an injection position and a waiting position in such a manner that while one respective injection unit is in the injection position and operative for injection, another respective injection unit is in the waiting position where change of molding material can be performed; and wherein said channel distributor comprises a double-tube structure composed of outer and inner cylindrical tubes rotatable relative to each other about their common axis, said outer cylindrical tube having on its outer peripheral surface a plurality of liquid pressure ports vertically spaced at predetermined distances, said inner cylindrical tube having, in its outer peripheral surface at positions confronting respective liquid pressure ports, a plurality of annular grooves, each annular groove is provided with a radial channel extending radially, ends of each of said radial channels communicating with a plurality of ends of axial channels which are formed inside said inner cylindrical tube in parallel relationship to the axis of said inner cylindrical tube and which open to an end surface of said inner cylindrical tube.

4. A vertical injection molding machine according to claim 3, wherein said outer cylindrical tube is fixedly secured to a support member fixed with respect to Said machine base, with respect to which said inner cylindrical tube is rotatable.

5. A vertical injection molding machine according to claim 1, wherein said upper mold attachment plate has on its upper surface a vertical shaft for rotationally mounting the rotary disc, and a high-pressure air supply channel which has a high-pressure air ejection port opening to one or more recesses distributed over the upper surface of said upper mold attachment plate.

6. A vertical injection molding machine according to claim 5, wherein said upper mold attachment plate has also a locking mechanism for positioning the rotary disc.

7. A vertical injection molding machine according to claim 5, wherein the rotary disc is operatively connected to a drive motor.

8. A vertical injection molding machine according to claim 1, wherein said at least one injection hole comprises two spaced apart injection holes, defining two molding paths, said plurality of peripheral injection cylinder insertion holes alignable with both said two spaced apart injection holes.

* * * * *